3,288,830
POLYHYDROXYL COMPOUNDS CONTAINING
A GROUP V ELEMENT
John P. Stallings, Mentor, and Frank B. Slezak, Painesville, Ohio, assignors to Diamond Alkali Company, Cleveland, Ohio, a corporation of Delaware
No Drawing. Filed Sept. 20, 1962, Ser. No. 225,159
11 Claims. (Cl. 260—446)

This invention relates to the production of flame-resistant, rigid polyurethane foam materials of uniformly fine, closed-cell structure. More particularly, it relates to a novel polyol having incorporated therein, a substantial percentage of halogen in combination with an element of Group V of the Periodic Table, especially antimony, and to the use of this composition in the production of totally flame-resistant, rigid polyurethane foam.

Since their initial development, rigid polyurethane foam materials have enjoyed ever increasing use in industry. Their commercial acceptance has been especially pronounced in the field of insulation as these foams exhibit superior thermal insulating properties because of their uniform, fine, closed-cell structure. They have thus been employed successfully to insulate refrigerated railroad cars, trailer trucks, storage tanks, certain types of refrigerators and freezers and the like. In such applications, it has been possible to apply the fabricated foam in thicknesses which are up to 50 percent less than that normally required with other types of insulation to maintain the same desired levels of refrigeration. By employing polyurethane foam, therefore, much less space is required by the insulating material, and a substantial increase in storage capacity can be realized.

While being extremely light, low-density materials, polyurethane foams possess great structural strength and rigidity. They may be applied as a sandwich construction, i.e., laminated between panels of various compositions, or by various foam-in-place techniques to insulate wood and masonry construction. In addition to their thermal insulating properties, these foams are excellent vapor barriers. When applied in such construction, they prevent moisture from migrating from the interior and causing undesirable conditions on the outer walls such as paint blistering, peeling, damping and the like.

Up to the present time, however, commercially available, conventional, rigid polyurethane foams generally have been highly flammable, i.e., they will burn rapidly and freely when contacted with a flame. This property in many instances has been a deterrent to the use of these materials in applications, as for example, in residential construction, wherein safety and non-flammability are of prime importance.

In general, rigid polyurethane foam is produced by reacting a polyisocyanate with a compound containing two or more hydroxyl groups, such as a glycol, a polyester polyol or a polyether polyol. The reaction is conducted usually in the presence of a catalyst as initiator, and with a blowing agent which is volatilized by the heat developed in the reaction. The gaseous material is then dispersed as bubbles throughout the reaction mix, thereby expanding it to its cellular form.

As taught by the prior art, several modifications of the basic urethane reaction system have been made heretofore in an attempt to produce flame-resistant foam material. For example, there has been incorporated in the foam system by physical blending, additives such as phosphates or phosphonates, which technique has not proved satisfactory. While the resultant foam product may exhibit initially a high grade of fire-retardancy, it does not retain this property permanently, however, as the added phosphorus-containing compound is removed from the foam by evaporation or by leaching. The evaporation or the leaching process is significantly accelerated when the foam is exposed to highly humid conditions and elevated temperatures.

In place of a phosphorus-containing additive as outlined hereinabove, an antimony compound, such as antimony trioxide, also has long been employed to impart flame-resistance to rigid polyurethane foam, said compound usually being incorporated and dispersed in the foam formulation in a finely-divided state. Being significantly higher in density than the foam mixture and not compatible therewith, the antimony compound soon settles out of suspension on storage. Before foaming operations, therefore, the foam formulation must again be thoroughly agitated to assure a homogeneous mixture from which a foam product of uniform flame-resistant character may be prepared. Another satisfactory method of incorporating an antimony compound such as antimony trioxide comprises adding the compound as a fine dispersion in a liquid organic vehicle, such as an aliphatic hydrocarbon. After thorough blending, the vehicle then must be removed from the foam mix prior to foaming operations. Although the antimony remains uniformly dispersed for a long period of time by this method, the additional processing operations required normally make the method economically unfeasible.

It is the object of this invention, therefore, to provide a means whereby a halogen and especially a Group V element may be chemically incorporated into a component of a rigid polyurethane foam formulation and will thus permanently remain intimately distributed in said component.

It is another object of this invention to provide, for reaction in a rigid polyurethane foam formulation, a hydroxyl-ended compound containing along with a percentage of halogen, e.g., chlorine, a percentage of a Group V element, e.g., antimony, sufficient to impart non-burning character to the foam product prepared therefrom.

Still another object of this invention is to provide rigid polyurethane foam products of uniform, fine closed-cell structure with completely non-burning characteristics.

These objects are accomplished by reacting, with the ultimate loss of water, a halide of a Group V element with an aliphatic polyol which has at least three hydroxyl or other appropriate functional groups; mixing with a polyisocyanate in the presence of a blowing agent and without the application of external heat, appropriate amounts of the polyol so prepared, said polyol being used either alone or in admixture with one or more other aliphatic or aromatic polyether polyols. The resulting expanding foam products are then applied into the fabricated form desired.

More specifically, the present invention involves reacting, at a temperature within the range of about 55° to 160° C., an antimony chloride such as antimony trichloride with a polyol containing at least three functional hydroxyl groups, e.g., glycerol. However, the hydrogen chloride which is formed initially as a by-product of the reaction is not reclaimed therefrom but, in turn, reacts with the antimony-containing polyol so formed. Chlorine is thereby incorporated into the product, said chlorine replacing some of the hydroxyl groups originally present. The free water formed in the condensation reaction is removed preferably with the aid of either an aliphatic or aromatic azeotroping agent, such as toluene or n-octane. The liquid hydroxyl-ended chlorine and antimony-containing reaction product, either alone or in admixture with other aliphatic or aromatic, halogenated or non-halogenated polyether polyols, is blended with a polyisocyanate, e.g., tolylene diisocyanate, crude diphenylmethane 4,4′-diisocyanate and the like. The mixing of the polyol and polyisocyanate components and their subsequent chemical reaction are effectively accomplished at room temperature. In the mixture are likewise employed a blowing agent such as a fluoro- or chlorofluorohydrocarbon and a foam stabilizer or surfactant, e.g., a detergent or a silicone oil. As the exothermic reaction between the polyol and the polyisocyanate progresses, sufficient heat is evolved to volatilize the blowing agent. Depending upon the foaming technique employed, the foam mixture is then allowed to expand in place or is poured onto a conveyer, or into suitable molds, where expansion and curing of the foam product is completed.

Of particular advantage in the practice of the present invention is that it is not necessary to employ in the foam formulation a catalyst such as those normally used heretofore to initiate the polyol-polyisocyanate cross-linking reaction. In addition to its significant active hydrogen content and its flame-retarding activity, the product of this invention likewise proves an efficient reaction catalyst, and desirable foam products are quickly prepared from the otherwise catalyst-free foam formulations in which it is incorporated.

The completely flame-resistant, rigid polyurethane foam products of this invention are thermosetting, cellular materials of low density, preferably within the range of 1.5 to 6 pounds per cubic foot. Composed essentially of a uniform, fine closed-cell structure, they exhibit compressive strengths at 10% deflection varying between 15 and 36 pounds per square inch. They possess good dimensional stability, low thermal conductivity, permanent resistance to moisture absorption or hydrolysis and excellent chemical resistance.

The rigid polyurethane foam products of this invention exhibit completely non-burning characteristics when tested for flame-resistance in accordance with the American Society for Testing Materials rate of burning test (ASTM D1692–59T).

As described previously, the hydroxyl-rich product of this invention is prepared by reacting with the loss of water, a halide salt of a Group V element, e.g., antimony trichloride, bismuth trichloride, vanadium trichloride and the like, with a polyol such as glycerol. At least two to five moles, and preferably about three moles of said polyol are employed for each mole of halide used.

When employing glycerine, for example, the reaction proceeds initially in accordance with the following general representative equation to yield, as the product, a mixture comprised of halogen and Group V element-containing polyol isomers as shown:

(I) $MX_3 + CH_2CHCH_2 \longrightarrow MX_2(OCH_2CHCH_2)$
         $\quad\;\; | \;\; | \;\; | \qquad\qquad\qquad\qquad | \;\; |$
         $\quad\;\; OH\;OH\;OH \qquad\qquad\qquad\;\; OH\;OH$ $MX(OCH_2CHCH_2)_2, \; M(OCH_2CHCH_2)_3$
$\quad\quad\;\; | \;\; | \qquad\qquad\qquad\quad\; | \;\; |$
$\quad\quad\;\; OH\;OH \qquad\qquad\qquad\; OH\;OH$

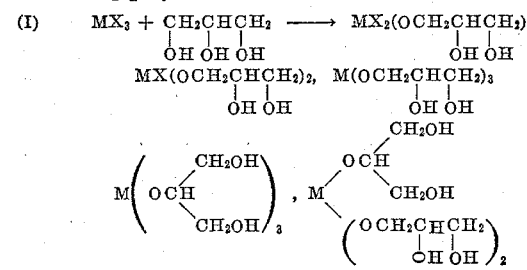

and/or

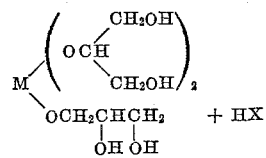

wherein M is an element of Group V of the Periodic Table of elements and X is halogen.

Also present in the initial product, in addition to by-product hydrogen halide and unreacted glycerine, may be dimers and trimers of any or all of the isomeric polyols possibly prepared in the process. As the reaction proceeds, the by-product hydrogen halide reacts with the products of Equation I, with the halogen replacing some of the hydroxyls of the initially formed materials. The water formed in this recation is removed by condensation. The final product, therefore, is a mixture comprised of the halogenated Group V element-containing polyol isomers of Equation I, which may be represented by the structures:

(II)

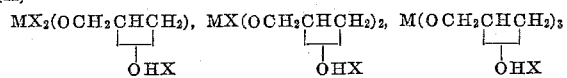

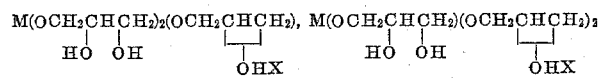

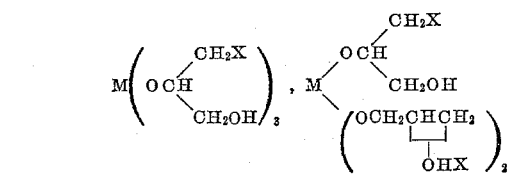

and/or

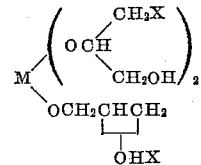

wherein M is a Group V element and X is halogen.

Also present may be the numerous other halogenated isomeric polyols possible from such a hydrohalogenation process. The reaction product likewise contains various amounts of dimers and trimers of any or all of said halogenated isomeric polyols, free glycerine, glycerine halohydrins and from about 2 to 4 percent free water.

In the practice of this invention the preferred Group V element is antimony and for this reason specific examples may be made hereinafter to halides of this element and especially to antimony chlorides. However, such specific references as will be made hereinafter are for purposes of illustration and are not intended in any way to so limit the scope of the present invention.

A critical factor involved in the reaction is the quantity of water condensate removed therefrom, which quantity may be predetermined by calculations based on the molar quantity of halide of the Group V element employed. Removal of water condensate in prescribed amounts is critical since the reaction may be closely controlled by this variable and products having the desired properties for optimum performance in foaming operations are obtained. Thus, by removing, for each mole of halide of Group V element, e.g., antimony trichloride, used in the reaction, from 0.5 to 3.5 moles and preferably about 0.5 to 1.5 moles of water condensate, polyols providing the most efficient performance are prepared, having a hydroxyl number within the desired range.

In the reaction optionally conducted in an inert atmosphere, the preferred inorganic halide employed is antimony trichloride, but halides of other Group V elements, such as bismuth and phosphorus trichlorides, and also the halides of Group V-b elements, i.e., vanadium, niobium and tantalum, may likewise be employed to give hydroxyl-rich products yielding in reaction with a polyisocyanate satisfactory flame-resistant rigid foams. Additionally, mixtures of these halides of Group V elements may be advantageously reacted. In addition to glycerol, which is the preferred polyol employed, other polyols containing at least three hydroxyl groups may also be used. Such materials include pentaerythritol, trimethylol propane, 1,2,4-butanetriol and 1,2,6-hexanetriol. Polymeric polyols, e.g., polypropylene triols and polyols, poly(butylene glycol), poly(styrene glycol), poly(epichlorohydrin) and the like, are also satisfactory. Also employed may be mixtures containing glycerol and (1) polyols such as trimethylolpropane, 1,2,4-butanetriol, or (2) other polyhydroxy compounds such as sugars, reduced sugars or alkylene oxide adducts thereof.

It is likewise possible to obtain satisfactory polyol products of this invention by employing varying quantities of polyol or polyol mixture in proportion to the amount of particular inorganic halide incorporated therein. For example, from about 2 to 5 moles of polyol or polyol mixture for each mole of halide may generally be reacted. However, by employing in a preferred ratio about 2½ to 3½ moles of polyol for each mole of halide, products are obtained which (1) can be most effectively cross-linked; (2) impart flame-resistance most efficiently to foams prepared therefrom; and (3) are the most effective reaction catalysts in the foam formulation irrespective of the foaming technique employed.

The reaction is carried out preferably in the presence of an azeotroping agent to aid in the removal of the water condensate formed, said agent generally used being either an aliphatic or aromatic low-boiling hydrocarbon such as n-hexane, n-octane, toluene, xylene and the like.

The reaction between the polyol and the halide of the Group V element, as antimony trichloride, is carried out for a time sufficient to recover the critical quantity of water condensate, i.e., about 0.5 to 3.5 moles per mole of the halide. This time usually varies from about 1 to 4 hours. However, reaction times of 1 to 2 hours are typical when an azeotroping agent is used.

The polyol products of this invention are liquids of low viscosity with the preferred products exhibiting Brookfield viscosities within the range of 8,000 to 20,000 centipoises at 25° C. They contain, in addition to the percentage of combined halide, e.g., about 18 to 22 percent of chlorine, a high percentage of a Group V element, e.g., about 24 to 28 percent of combined antimony. They have hydroxyl numbers ranging from 200 to 600, preferably within the range of 350 to 550 (as determined by the method outlined in Siggia, S. "Quantitative Organic Analysis via Functional Groups," 2nd Edition, Wiley and Sons, Inc., page 9 (1958)). They may usually contain up to about 4.0 percent free water.

To make the rigid foam product, the liquid hydroxyl-ended product of this invention may be reacted with a polyisocyanate compound, e.g., a diisocyanate, in the presence of a blowing agent, the conversion of said reactant mix into said foam product being effected quickly with the heat evolved in the reaction, and without the application of additional external heat. Since the product of this invention likewise performs efficiently as a catalyst, no additional catalyst is required to quickly initiate the polyol-polyisocyanate reaction. The reactant mix also contains usually a foam-stabilizing agent to keep the developing cell structure of the expanding products from collapsing before it has been cured.

A totally flame-resistant rigid polyurethane foam material may likewise be prepared employing the polyol of this invention in admixture with other aliphatic or aromatic polyether polyols which may be either halogenated or non-halogenated materials. An example of such a polyol is the chlorinated, hydroxyl-ended polyether which is the subject of a copending application, Serial No. 216,075, filed August 10, 1962, in the names of Frank B. Slezak, Irving Rosen and John P. Stallings. As will be shown hereinafter by a specific example, formulating with such compounds even a small amount of the polyol of this invention (about 2 to 5 percent of the total polyol content) renders non-burning the foam products resulting therefrom, whereas these products as made previously without incorporating the product of this invention have sometimes exhibited merely self-extinguishing characteristics depending on the polyisocyanate used. It should likewise be stated that in formulating foam systems containing these polyol mixtures, the polyol product of this invention likewise serves as a reaction catalyst and no additional catalyst, as used heretofore, is required.

As a polyisocyanate component of the foam formulation, there generally may be used any of the polyisocyanates commercially available at the present time, particularly the aromatic polyisocyanates since these compounds are both more reactive than the aliphatic types, and are less toxic. Polyisocyanates which may thus be used include polymethylene polyphenylisocyanate, 2,4-tolylene diisocyanate and/or 2,6-tolylene diisocyanate, crude diphenylmethane 4,4'-diisocyanate, 3,3'-dimethoxy-4,4'-diphenylene diisocyanate, 1,5-naphthyl diisocyanate and the like.

In the foam formulation, the polyisocyanate compound generally is used in a slightly excessive amount with respect to the polyol component, i.e., in an amount contributing from 1.00 to 1.20 and, preferably from 1.05 to 1.10, isocyanate equivalents for each hydroxyl equivalent employed. For example, with 125 grams, or the hydroxyl equivalent weight of a polyol having a hydroxyl number of 450, from about 138 to 165 grams of crude diphenyl methane 4,4'-diisocyanate are used. By formulating the polyol and polyisocyanate components in the ratios as described, the most desirable foam products are produced.

As the blowing agent, it has been found most advantageous to employ a chlorofluorohydrocarbon, e.g., trichlorofluoromethane, since such a material is non-flammable, is relatively inert and non-reactive with the foam components and possesses the required volatility characteristics for optimum performance in the different techniques employed for foam fabrication. The blowing agent generally is used in amounts varying between 15 and 35 percent by weight of the polyol component.

A surfactant is normally incorporated in rigid foam systems as a foam stabilizer, i.e., to aid in the development of the fine, closed-cell structure desired and also to keep said cell structure from disintegrating before it has been strengthened by curing. Used herein in an amount varying between 0.5 and 0.75 percent by weight of the total formulation excluding the blowing agent, a silicone oil is satisfactory as the foam stabilizer.

With regard to the procedure for mixing the foam ingredients, the polyol component is usually admixed thoroughly with the surfactant and blowing agent regardless of the particular foaming technique being employed. The polyisocyanate is usually mixed with the other foam ingredients just prior to the foaming operation since the reaction between the polyisocyanate and the hydroxyl-containing component proceeds with the liberation of heat. With the evolution of heat, the blowing agent is volatilized and expansion of the foam mass follows.

In addition to a "one-shot" foaming technique as described hereinabove, a quasi-prepolymer formulating method also may be employed. Such a technique involves reacting a portion of the polyhydroxy component, and especially when a polyol mixture is employed as said component, with an excess of the polyisocyanate component at some time substantially prior to the foaming operation.

The time required to convert the foam mass into the fully expanded foam product may vary appreciably, as for example, in a time period varying from about 5 seconds up to about 2 minutes. Thereafter, the expanded foam material is air-cured for about 30 minutes before it is stored or used.

Various additives may likewise be incorporated into the foam formulation so as to modify foam properties. For example, dyes or pigments may be incorporated to color the foam products. Fillers, such as clays, calcium carbonate, fibrous materials and the like, may be added to reduce foam costs. Additionally, additives such as various monomeric and polymeric polyols having at least two but preferably three or more hydroxyl, functional groups may be incorporated, said additives serving to improve the strength and compressive properties of the foam products while not adversely affecting their flame-resistant character.

In order that those skilled in the art may better understand the present invention and the preferred methods by which it may be practiced, the following specific examples are offered.

EXAMPLE 1

Part A.—Preparation of antimony and chlorine-containing polyol

Into a one-liter, three-necked, round-bottom flask are charged 40 milliliters toluene, 552 grams (6 moles) of glycerine and 436 grams (2 moles) of anhydrous antimony trichloride. The flask is then fitted with a mechanical stirrer, a thermometer, a reflux condenser to which is connected a water trap, a heating mantle and nitrogen inlet and outlet tubes. As nitrogen is passed through the flask at a slow rate (about 0.002 cubic feet per minute) the reaction mixture is heated with rapid stirring to a temperature of about 50° to 55° C., at which temperature solution is effected. The reactant solution is then heated to a maximum of 155° C. and maintained at this temperature with vigorous agitation for one and one-half hours. During this time period, 36 ml. of water condensate (1 mole per mole of antimony trichloride) is collected and the toluene azeotrope is recovered. The polyol obtained, a fluid resin somewhat brownish in color, has a hydroxyl number of 522. As determined by analysis, it contains 26.0 percent antimony, 20.8 percent chlorine and 3.59 percent free water.

Part B.—Preparation of a rigid polyurethane foam

Into an 8-ounce Dixie cup are placed 10.7 g. of the antimony and chlorine-containing polyol product of Part A above, 0.3 g. of L–1530 silicone oil (marketed by Union Carbide Chemical Company) and 4.5 g. of trichlorofluoromethane blowing agent. These ingredients are mixed by manual stirring until homogeneous (about 1 minute). Sixteen grams of a crude diphenylmethane 4,4'-diisocyanate having an isocyanate equivalent of 138 is thereafter blended into this mixture, providing an isocyanate to hydroxyl equavalent ratio in the formulation of 1.16:1. In about 30 seconds, the foam formulation expands and reaches its maximum height in 20 seconds. The finished rigid foam has a density of 6 pounds per cubic foot, a uniformly fine closed-cell structure and good compressive strength. Tested for flame resistance in accordance with the American Society for Testing Materials rate of burning test (ASTM D1692–59T), it is totally non-burning.

EXAMPLE 2

Following the same procedure as outlined in Part A of Example 1, antimony and chlorine-containing polyols are prepared from which more than one mole of water of condensation is removed for each mole of antimony trichloride employed. The equipment used is the same as outlined in Example 1, along with the quantities of glycerine, antimony trichloride and the toluene azeotrope as previously used.

In one preparation, the reactant mix is heated to 50° to 55° C. to effect solution. It is then heated with agitation to the reflux temperature (155° C.) and maintained at this temperature for five hours. During this time period, 72 ml. of water (2 moles per mole of antimony trichloride) are condensed and collected and the azeotrope is recovered. The resulting polyol product has a hydroxyl number of 225 and contains 28.6 percent antimony.

In another preparation, the reactant solution obtained by heating the ingredients to 50° to 55° C. is thereafter heated with agitation to the reflux temperature and maintained at this temperature for seven and one-half hours. One-hundred-eight ml. of water (3 moles per mole of antimony trichloride) are collected during this time along with the toluene azeotrope. The fluid polyol obtained has a hydroxyl number of 212 and contains 27.3 percent antimony.

EXAMPLE 3

This example illustrates that, by incorporating with a non-chlorinated polyether polyol therein the polyol product of this invention, a rigid, totally flame-resistant polyurethane foam product is prepared from a formulation normally producing merely self-extinguishing foam products. The general procedure followed for formulating the foam mixture is the same as that outlined in Part B of Example 1 above, using a large-size mixing container.

A foam is first prepared without using the polyol of this invention. Five grams of L–5310 silicone oil (Union Carbide Chemical product), 590 g. of LK–380 (a triol having a hydroxyl number of 372.5, manufactured by Union Carbide Chemicals), 4 g. of T–9 catalyst (a stannous octoate-containing material sold by Metal and Thermit Corp.) and 225 g. of a trichlorofluoromethane blowing agent are intimately mixed together. To this mixture is then added 520 g. of crude diphenylmethane 4,4'-diisocyanate (isocyanate equivalent=138). The isocyanate to hydroxyl equivalent ratio in the formulation is thus 1.10:1. The foam mixture expands to its maximum height in 30 seconds. The foam product has a density of 2 pounds per cubic foot and a compressive strength at 10 percent deflection of 25.1 pounds per square inch. As tested for flame-resistance in accordance with ASTM D1692–59T, this foam burns at a rate of 2.4 inches per minute after the test flame is withdrawn, then becomes self-extinguishing.

A foam is then similarly prepared by mixing together 5.0 g. of L–5310 silicone oil, 471.5 g. of LK–380, 225 g. of trichlorofluoromethane blowing agent, and 19.5 g. of the antimony containing polyol of Part A of Example 1 above, providing in the total foam formulation an antimony content of 0.5 percent. Five-hundred-and-nine grams of the crude diphenylmethane 4,4'-diisocyanate are then blended into this mixture, providing a ratio of isocyanate to hydroxyl equivalents of 1.10:1. Without the addition of any reaction catalyst as used to prepare the first foam, the formulation mix quickly expands, reaching its maximum height in 50 seconds. The finished foam has a density of 1.8 pounds per cubic foot and a compressive strength at 10 percent deflection of 30.1 pounds per square inch. When tested for flame-resistance as with the previous sample, this foam product exhibits non-burning characteristics.

EXAMPLE 4

This example illustrates the increasing catalytic activity of the antimony and chlorine-containing polyol product of this invention when employed in a formulation similar to that of the previous example, but in an amount providing for the total formulation a higher antimony content.

Five grams of L–5310 silicone oil, 446.0 g. of LK–380, 252.5 g. trichlorofluoromethane and 39.0 g. of the polyol product of Part A of Example 1 are mixed together with a medium or high lift impeller such as manufactured by Fawcett Manufacturing Company, powered by a ⅖

H.P. drill motor. Five-hundred-and-eight grams of crude diphenylmethane 4,4'-diisocyanate is then blended into this mixture. The isocyanate to hydroxyl equivalent ratio is 1.10:1 and the antimony content of the formulation is 1.0 percent. The foam mixture quickly expands reaching its maximum height in 25 seconds, or in about half the time required for the formulation in which 0.5 percent antimony is incorporated. The finished foam has a density of 1.6 pounds per cubic foot, a compressive strength of 21.3 pounds per square inch at 10 percent deflection, and is completely non-burning by the ASTM D1692–59T test.

EXAMPLE 5

This example illustrates that foam formulations employing as the polyhydroxy component mixtures of chlorinated and non-chlorinated polyols from which merely self-extinguishing foams can be prepared are converted to stocks producing non-burning foams by incorporating therein the polyol product of this invention. When incorporated in such formulations, moreover, the polyol product serves as the polyhydroxy-polyisocyanate reaction initiator as well as providing a portion of the total hydroxyl content of the formulation.

A foam formulation is first prepared by mixing together 1.0 g. of L-5310 silicone oil, 52.2 g. of a chlorinated polyether polyol (hydroxyl number=451) which is prepared by reacting a tetrachloroxylylene dichloride with glycerine as described in the copending application Serial No. 216,075, to which reference has previously been made herein, 35.6 g. of an oxypropylated sucrose with a hydroxyl number of 450 (such as Voranol 450, marketed by Dow Chemical Company), 0.8 g. of C–16 catalyst (a proprietary amine-type catalyst manufactured by Mobay Chemical), and 37.5 g. of trichlorofluoromethane blowing agent. Into this mixture is then blended 109.0 g. of crude diphenylmethane 4,4'-diisocyanate so that the isocyanate to hydroxyl equivalent ratio in the formulation is 1.10:1. When reaction is initiated the foam mix expands and reaches its maximum height in 120 seconds. The finished foam has a density of 2.1 pounds per cubic foot and a compressive strength at 10 percent deflection of 25.9 pounds per square inch. Tested in accordance with ASTM D1692–59T, this foam burns at a rate of 2.68 inches per minute upon withdrawal of the test flame and becomes self-extinguishing.

A foam formulation is then prepared by mixing together 1.0 g. of L-5310 silicone oil, 52.0 g. of the chlorinated polyether, 31.3 g. of Voranol 450, 3.9 g. of the antimony and chlorine-containing product of Example 1 and 37.5 g. of trichlorofluoromethane. One-hundred-and-nine grams of crude diphenylmethane 4,4'-diisocyanate is then blended into this mixture (isocyanate to hydroxyl equivalent ratio=1.10:1). The resulting foam mix quickly reacts, expanding to its maximum height in 20 seconds. The finished foam product has a density of 2.01 pounds per cubic foot and a compressive strength at 10 percent deflection of 35.9 pounds per square inch. When tested for flame resistance (ASTM D1692–59T), it exhibits completely non-burning characteristics.

It is to be understood that, although the invention has been described with specific reference to particular embodiments thereof, it is not to be so limited, since changes and alterations therein may be made which are within the full intended scope of this invention as defined in the appended claims.

What is claimed is:

1. A liquid composition for use as a polyhydroxy component and as a reaction initiator in flame-resistant, rigid polyurethane formulations comprising at least one hydroxyl-ended compound selected from the group consisting of

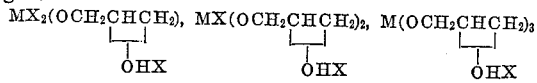

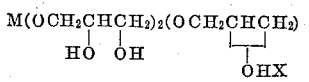

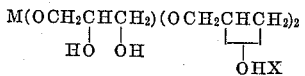

and

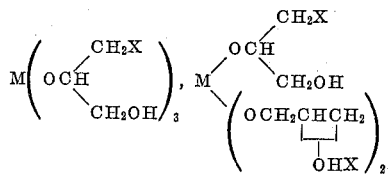

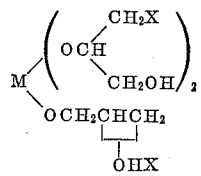

wherein M is an element of Group V of the Periodic Table of elements and X is halogen, and dimers and trimers of said polyols, said composition having a hydroxyl number within the range of 200 to 600 and containing at least 20 percent by weight of combined Group V element.

2. The composition of claim 1 wherein the Group V element is antimony and the halogen is chlorine, said composition having a hydroxyl number within the range of 200 to 600 and containing at least 20 percent by weight of combined antimony.

3. The composition of claim 2 having a hydroxyl number within the range of 350 to 550 and containing 26 percent by weight of combined antimony.

4. The process for preparing the composition of claim 1 which comprises reacting, at an elevated temperature, a halide of an element of Group V of the Periodic Table of elements with from 2 to 5 moles of an organic polyhydroxy compound per mole of said halide, said organic polyhydroxy compound being selected from the group consisting of monomeric and polymeric polyols having at least three hydroxyl groups per molecule and mixtures thereof, removing the water formed in the reaction and thereafter recovering the liquid polyol product.

5. The process for preparing the composition of claim 2 which comprises reacting, at an elevated temperature, an antimony chloride with from 2 to 5 moles of an organic polyhydroxy compound per mole of said antimony chloride, said organic polyhydroxy compound being selected from the group consisting of monomeric and polymeric polyols having at least three hydroxyl groups per molecule and mixtures thereof, removing the water formed in the reaction, and thereafter recovering the liquid antimony and chlorine-containing polyol product.

6. The process of claim 5 wherein the reaction temperature is within the range of 50° to 160° C. and from 0.5 to 3.5 moles of water are removed per mole of antimony chloride employed.

7. The process of claim 5 wherein the antimony chloride and the organic polyhydroxy compound are reacted in the presence of an organic azeotroping solvent to facilitate removal of the water formed in the reaction.

8. The process of claim 7 wherein the azeotroping solvent is a low-boiling hydrocarbon selected from the group consisting of toluene, n-hexane, n-octane and xylene.

9. The process of claim 5 wherein antimony trichloride is reacted with glycerine, said reactants being combined in a ratio of from 2 to 5 moles of glycerine for each mole of antimony trichloride.

10. The process of claim 5 wherein from 2.5 to 3.5 moles of glycerine are employed for each mole of antimony trichloride, and from 0.5 to 1.5 moles of water per mole of said antimony trichloride are removed.

11. The process of claim 5 wherein the organic polyhydroxy component is a mixture containing glycerine in combination with at least one aliphatic polyol selected from the group consisting of trimethylol propane, 1,2,4-butanetriol and 1,2,6-hexanetriol.

References Cited by the Examiner

UNITED STATES PATENTS

| | | | |
|---|---|---|---|
| 2,993,924 | 7/1961 | Marks et al. | 260—446 |
| 3,054,760 | 9/1962 | Worsely et al. | 260—2.5 |
| 3,075,927 | 1/1963 | Lanham | 260—2.5 |
| 3,081,327 | 3/1963 | Birum et al. | 260—446 |

TOBIAS E. LEVOW, *Primary Examiner.*

LEON J. BERCOVITZ, D. E. CZAJA, W. F. W. BELLAMY, *Assistant Examiners.*